(12) United States Patent
Inden

(10) Patent No.: US 8,839,687 B2
(45) Date of Patent: Sep. 23, 2014

(54) RECIPROCATING PISTON MECHANISM WITH EXTENDED PISTON OFFSET

(76) Inventor: Michael Inden, Belmont, CA (US)

( * ) Notice: Subject to any disclaimer, the term of this patent is extended or adjusted under 35 U.S.C. 154(b) by 134 days.

(21) Appl. No.: 13/477,815

(22) Filed: May 22, 2012

(65) Prior Publication Data

US 2013/0312550 A1 Nov. 28, 2013

(51) Int. Cl.
*F16H 21/18* (2006.01)
*F16C 7/00* (2006.01)
*F16C 9/00* (2006.01)
*F02B 75/32* (2006.01)

(52) U.S. Cl.
USPC ............ 74/42; 74/43; 74/45; 123/197.4; 123/197.3

(58) Field of Classification Search
CPC .......... F02B 75/048; F02B 75/32; F01B 9/02
USPC ............ 74/42, 43, 45, 47, 48, 49, 51, 53, 62; 123/197.1, 197.4, 197.3; 92/140
See application file for complete search history.

(56) References Cited

U.S. PATENT DOCUMENTS

| 810,347 | A |   | 1/1906  | Porter et al. |          |
|---------|---|---|---------|---------------|----------|
| 889,859 | A | * | 6/1908  | Robertson     | 74/44    |
| 1,506,626 | A | * | 8/1924  | Freer         | 74/40    |
| 1,779,163 | A | * | 10/1930 | Filicky       | 74/55    |
| 2,957,455 | A |   | 10/1960 | Bouvy         |          |
| 2,974,541 | A |   | 3/1961  | Dolza         |          |
| 3,998,200 | A | * | 12/1976 | Sudholt       | 123/197.1 |
| 4,532,819 | A | * | 8/1985  | Ross          | 74/44    |
| 4,628,876 | A |   | 12/1986 | Fujikawa et al. |        |
| 4,708,096 | A |   | 11/1987 | Mroz          |          |
| 4,945,866 | A |   | 8/1990  | Chabot, Jr.   |          |
| 4,974,554 | A |   | 12/1990 | Emery         |          |
| 5,025,759 | A | * | 6/1991  | Wenzel et al. | 123/53.4 |
| 5,070,220 | A |   | 12/1991 | Glenn         |          |
| 5,146,884 | A |   | 9/1992  | Merkel        |          |
| 5,186,127 | A |   | 2/1993  | Cuatico       |          |
| 5,535,709 | A | * | 7/1996  | Yoshizawa     | 123/63   |
| 5,554,627 | A |   | 9/1996  | Lewis et al.  |          |
| 5,749,262 | A |   | 5/1998  | Galvin        |          |
| 5,816,201 | A |   | 10/1998 | Garvin        |          |
| 6,009,845 | A | * | 1/2000  | Ehrlich       | 123/197.4 |
| 6,058,901 | A |   | 5/2000  | Lee           |          |
| 6,202,622 | B1 |  | 3/2001  | Raquiza, Jr.  |          |
| 6,460,505 | B1 |  | 10/2002 | Quaglino, Jr. |          |

FOREIGN PATENT DOCUMENTS

| DE | 2855667  | 7/1980  |
|----|----------|---------|
| DE | 3410548  | 9/1985  |
| FR | 2593232  | 7/1987  |
| GB | 1133618  | 6/1965  |
| GB | 2219345  | 12/1989 |
| JP | 60256642 | 2/1985  |

* cited by examiner

*Primary Examiner* — Troy Chambers
*Assistant Examiner* — Jake Cook

(57) ABSTRACT

The reciprocating piston mechanism with an extended piston offset is provided. The mechanism is of the type that contains at least one cylinder having a longitudinal axis, at least one piston that has a pivot pin and is slidingly installed in the cylinder, a crankshaft, which is offset at a distance from the longitudinal axis of the cylinder, a rocker arm/lever assembly pivotally mounted on a crankpin of the crankshaft. The mechanism is also provided with a connecting rod that connects the piston to one arm of the rocker arm/lever assembly. The other arm of the rocker arm/lever assembly has a roller that is guided in a confined pathway and works as a fulcrum of the lever and a stabilizer/rudder at the same time.

2 Claims, 6 Drawing Sheets

RECIPROCATING PISTON MECHANISM WITH EXTENDED PISTON OFFSET

TECHNICAL FIELD

The present invention relates to a reciprocating piston mechanism such as an internal combustion engine, compressor, pump or the likes. More specifically, the present invention relates to modular sub-assemblies for an internal combustion engine, compressor, pump or the likes, which include a crankshaft and a piston with an offset between the piston center line and a longitudinal axis of the crankshaft. This altered geometrical relationship provides increased power and torque for an internal combustion engine in part by significantly reducing friction between the piston and a cylinder.

BACKGROUND OF THE INVENTION

Internal combustion engines (ICE) are any of a group of devices in which the reactant of combustion, e.g., oxidizer and fuel, and the products of combustion serve as the working fluids of the engine. The basic design concept of ICE has not changed for more than 100 years.

The basic components of an internal combustion engine are well known in the art and include the engine block, cylinders, pistons, connecting rods, crankshaft, valves and camshaft. Such an engine gains its energy from the heat released during the combustion of the non-reacted working fluids, e.g., the oxidizer-fuel mixture. In all internal combustion engines, useful work is generated from the hot, gaseous products of combustion acting directly on moving surfaces of the engine, such as the top or crown of a piston.

One of the primary and consistent design goals for internal combustion engines is to increase power and torque. If the crankshaft/piston mechanism is configured appropriately, the engine may benefit through increased torque placed on the crankshaft as well as a reduction in friction forces between the piston and the cylinder. Referring to FIG. 1, a reciprocating piston mechanism with extended piston offset is disclosed generally in pending U.S. patent application Ser. No. 12/932,053 to Michael Inden, filed on Feb. 17, 2011, titled "Reciprocating Piston Mechanism with Extended Piston Offset", which is herein incorporated by reference in its entirety. The apparatus 20 (for simplicity of the drawing and description, the cylinder block of an engine and other engine components are not shown) is a driveshaft and piston assembly that comprises a rotary driveshaft 22 (hereinafter referred to merely as "a shaft") of a square cross-section which includes a circular eccentric 24 mounted in its indexed position and a pair of integrally mounted cylindrical bushings 26a and 26b. The shaft 22 is journaled at the bushings 26a and 26b for rotation about a shaft axis 28. A rocker arm/lever 30, which is pivotally mounted on a circular eccentric 24, has one extended arm 32 pivotally connected to one end of the connecting rod 36 with a pin (not shown) and another extended arm 34 has a pivotally mounted pair of rollers 38a and 38b with a pin 40. The connecting rod 36 at its top distal end is pivotally connected to a piston 42. The mechanical linkage of the connecting rod 36 to the piston 42 and the rocker arm/lever 30 and the circular eccentric 24 which is indexed on the shaft 22 and serves to convert the reciprocating motion of the piston (as indicated by directional arrow A for the piston 42) to the rotational motion (as indicated by directional arrow B) of the shaft 22. The cylindrical bushings 26a and 26b have a coaxial opening of substantially the same cross-section as a cross-section of the shaft 22.

However, the principle of the reciprocating piston mechanism with extended piston offset is not limited by the configuration disclosed generally in pending U.S. patent application Ser. No. 12/932,053 to Michael Inden, filed on Feb. 17, 2011, titled "Reciprocating Piston Mechanism with Extended Piston Offset". The Applicant found one more configuration for realization of the above-described principle.

SUMMARY OF THE INVENTION

It is an object of this invention to provide a reciprocating piston mechanism which will reduce dependency between a piston stroke and the length of a crankshaft moment arm or a crank.

It is an object of this invention to reduce friction between a piston and a cylinder of an internal combustion engine.

It is an object of this invention to provide a reciprocating piston mechanism to increase force applied to an offset rod journal, or a crankpin of the crankshaft.

It is an object of the invention to provide a reciprocating piston mechanism with an increased torque on the crankshaft of the engine.

It is another object of this invention to provide a reciprocating piston mechanism for an internal combustion engine which increases fuel efficiency for the required engine power output.

It is yet another object of the invention to provide a reciprocating piston mechanism for an internal combustion engine which is simple in design and inexpensive to manufacture. The reciprocating piston mechanism of the present invention, e.g., for an internal combustion engine with extended piston offset, is of the type that contains at least one cylinder having a longitudinal axis, at least one piston that has a pivot pin and is slidingly installed in the cylinder, a crankshaft having a central axis, which is offset at a distance from the longitudinal axis of the cylinder, a rocker arm assembly, which in essence is a second order lever, pivotally mounted on the crankpin of the crankshaft and a connecting rod connecting the piston and one arm of the rocker arm/lever assembly. The other arm of the rocker arm/lever assembly can move back and forth only along a substantially defined line in a confined pathway or a guide and works as a stabilizer/rudder. In other words, a distinguishing feature of the reciprocating piston mechanism of the invention with extended piston offset is the rocker arm/lever assembly which is pivotally mounted on the crankpin of the crankshaft and a fulcrum which moves along a substantially defined line in the guide during rotation of the driveshaft. The distance from the central axis of the crankshaft and the longitudinal axis of the cylinder is always greater than 0. Such a construction significantly improves torque applied to the crankshaft and efficiency of the engine.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

Figure 1:
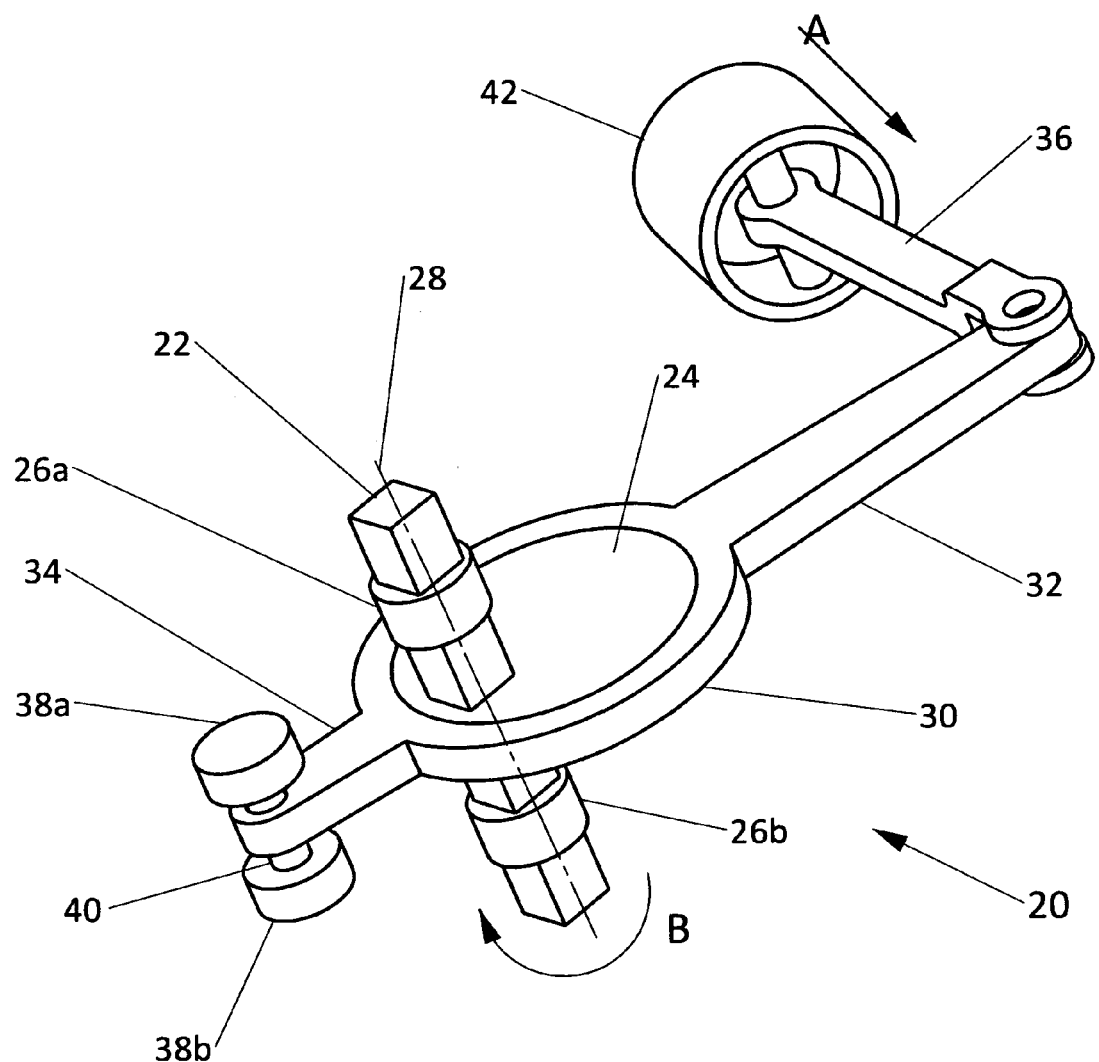
FIG. 1 is a perspective view of an exemplary embodiment of the apparatus of the prior art crankshaft-free driveshaft and piston assembly for an inline internal combustion engine.
Figure 2:
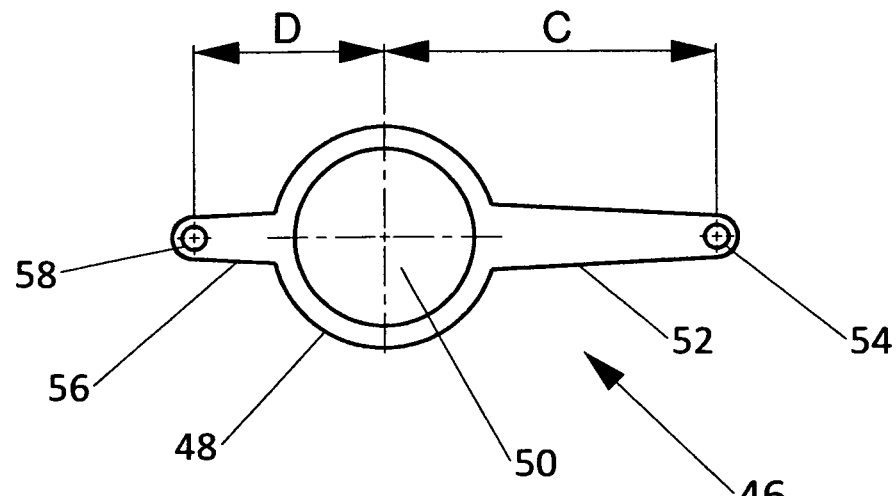
FIG. 2 is a front view of the exemplary embodiment of a prior-art rocker arm/lever of the apparatus of FIG. 1.

The basic components of a reciprocating piston mechanism are well known in the art and include at least one cylinder, one piston, a connecting rod and a crankshaft. For better understanding of the distinguishing features of the present invention, it would be appropriate again to refer to the structure of a rocker arm/lever used in an internal combustion engine which was disclosed in pending U.S. patent application Ser. No. 12/932,053 to Michael Inden, filed on Feb. 17, 2011, titled "Reciprocating Piston Mechanism with Extended Piston Offset" by the same applicant and the modifications which the present application is introducing. More specifically, FIG. 2 illustrates an exemplary embodiment of a rocker arm/lever of the apparatus of the prior art comprised of a crankshaft-free driveshaft, rocker arm/lever and piston assembly of an internal combustion engine. The big portion 48 of the rocker arm/lever 46 has an opening 50 in which the circular eccentric 24 is pivotally installed for realization of the aforementioned pivotal connection of the circular eccentric 24 to the rocker arm/lever 46. The rocker arm/lever 46 has one extended arm 52 with an opening 54 at the distal end of it for pivotally connecting to one end of the connecting rod 36 with a pin (not shown) and another extended arm 56 with an opening 58 at the distal end of it for pivotally mounting a pair of rollers 38a and 38b with a pin 40. Length of the first arm 52 is indicated by letter "C" as a distance between the opening 50 of the big portion 48 of the rocker arm/lever 46 and the opening 54 of the extended arm 52. Distance "C" is defined by design requirements. Length of the second arm 56 is indicated by letter "D" as a distance between the opening 50 of the big portion 48 of the rocker arm/lever 46 and the opening 58 of the extended arm 56. This parameter is defined by design requirements as well.

Figure 3:
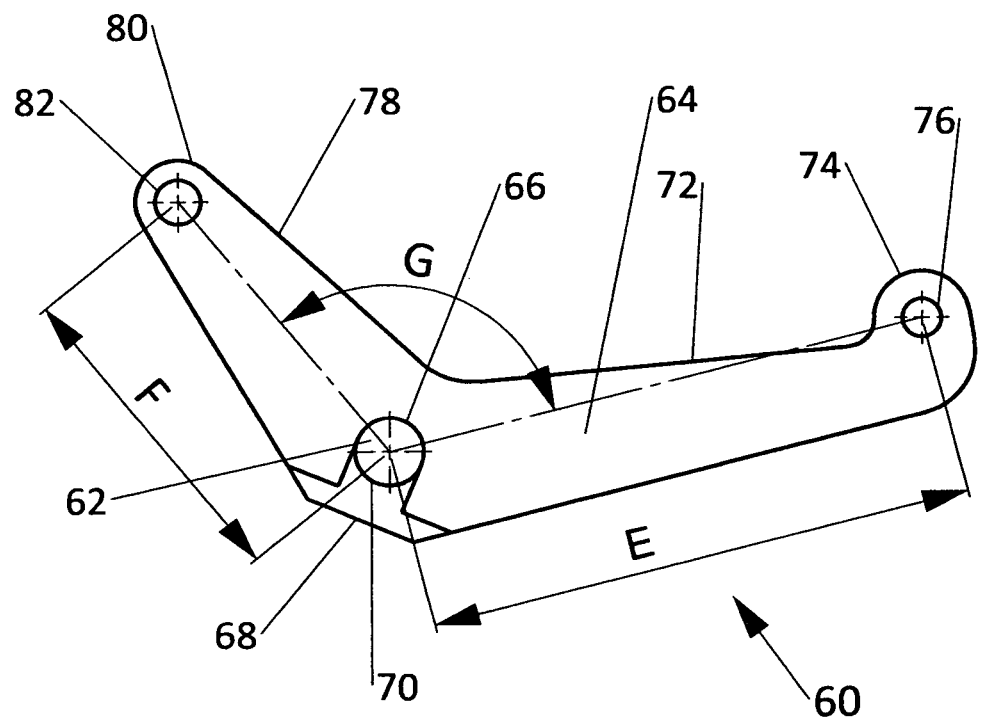
FIG. 3 is a front view of an exemplary embodiment of a rocker arm/lever assembly for an inline engine of the present invention.
Figure 4:
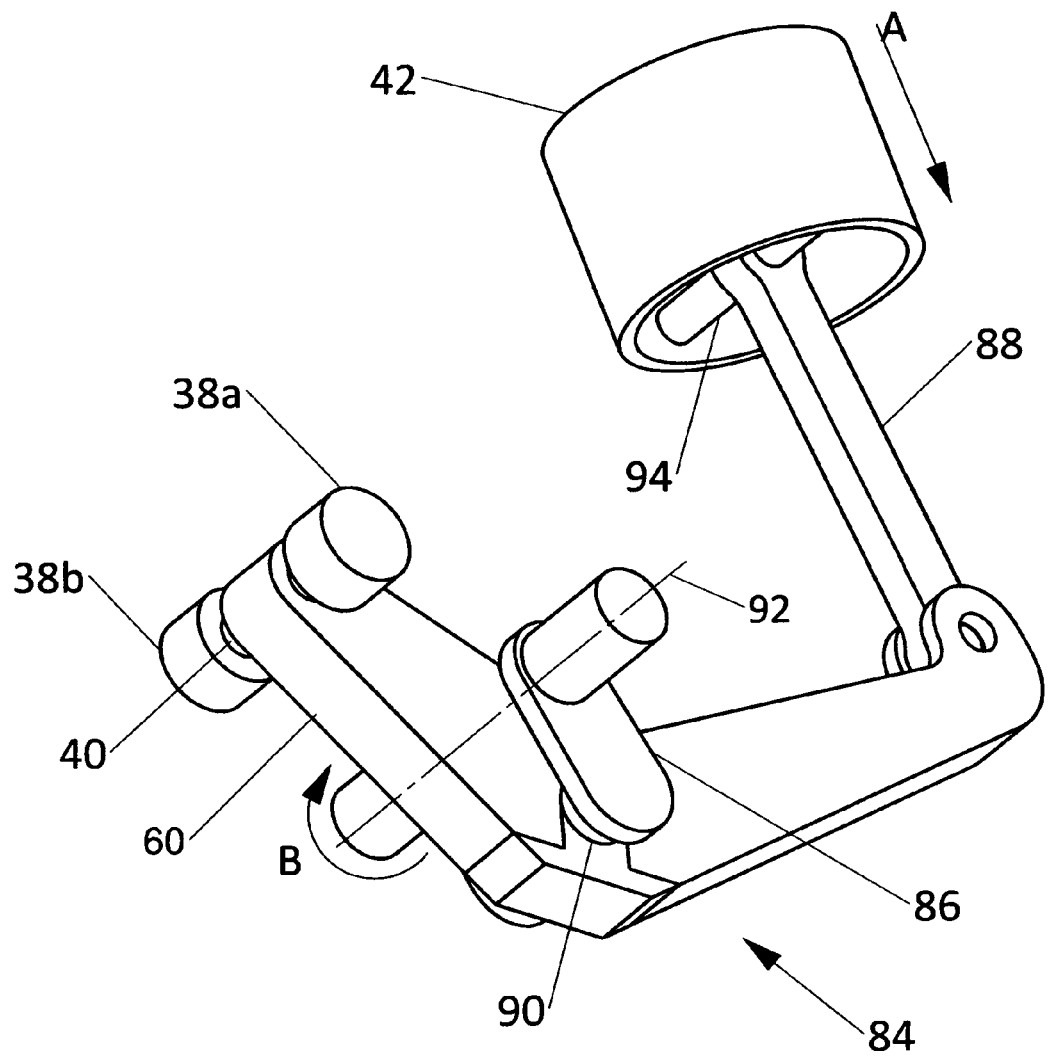
FIG. 4 is a perspective view of an exemplary embodiment of an apparatus for an inline engine of the present invention.

FIG. 3 is an example of an assembly of a rocker arm/lever 60 of the present invention. As can be seen from FIGS. 2 and 3, the opening 50 of the big portion 48 of the rocker arm/lever 46 for accepting the circular eccentric 24 of the prior art is replaced by an opening 62. This opening 62 is formed by a main body 64 of the rocker arm/lever assembly 60 with a semicircular opening 66 and an attached retaining portion 68 with a semicircular opening 70. The retaining portion 68 is fastened to the main body 64 of the rocker arm/lever assembly 60, thus defining the opening 62 which is a cylindrical concavity for realization of a pivotal connection to the crankpin 90 of the crankshaft 86 as shown in FIG. 4. The main body 64 of the rocker arm/lever assembly 60 has one extended arm 72 with an opening 76 at the distal end 74 of it for pivotally connecting to one end of the connecting rod 88 (FIG. 4) with a pin (not shown) and another extended arm 78 with an opening 82 at the distal end 80 of it for pivotally mounting a pair of rollers 38a and 38b with a pin 40. Length of the first arm 72 is indicated by letter "C" as a distance between the opening 62 of the rocker arm/lever assembly 60 and the opening 76 of the extended arm 72. Distance C and exact configuration of the arm 72 are defined by design requirements. Length of the second arm 78 is indicated by letter "D" as a distance between the opening 62 and the opening 82 of the extended arm 78. This parameter and exact configuration of the arm 78 are defined by design requirements as well. An angle "G" between the first arm 78 and the second arm 72 is defined by design requirements as well.

FIG. 4 of the entire assembly of the reciprocating piston mechanism with extended piston offset of the present invention, which as a whole is designated by reference numeral 84, comprises the piston 42, a crankshaft 86, the rocker arm/lever assembly 60 and the connecting rod 88. The extended arm 78 of the rocker arm/lever assembly 60 has the pair of roller 38a and 38b on the pin 40 pivotally mounted in the opening 82. This assembly serves to convert the reciprocating motion of the piston 42 as indicated by arrow A to the rotational motion of the crankshaft 6 as indicated by arrow B about a crankshaft axis 92.

Figure 5:
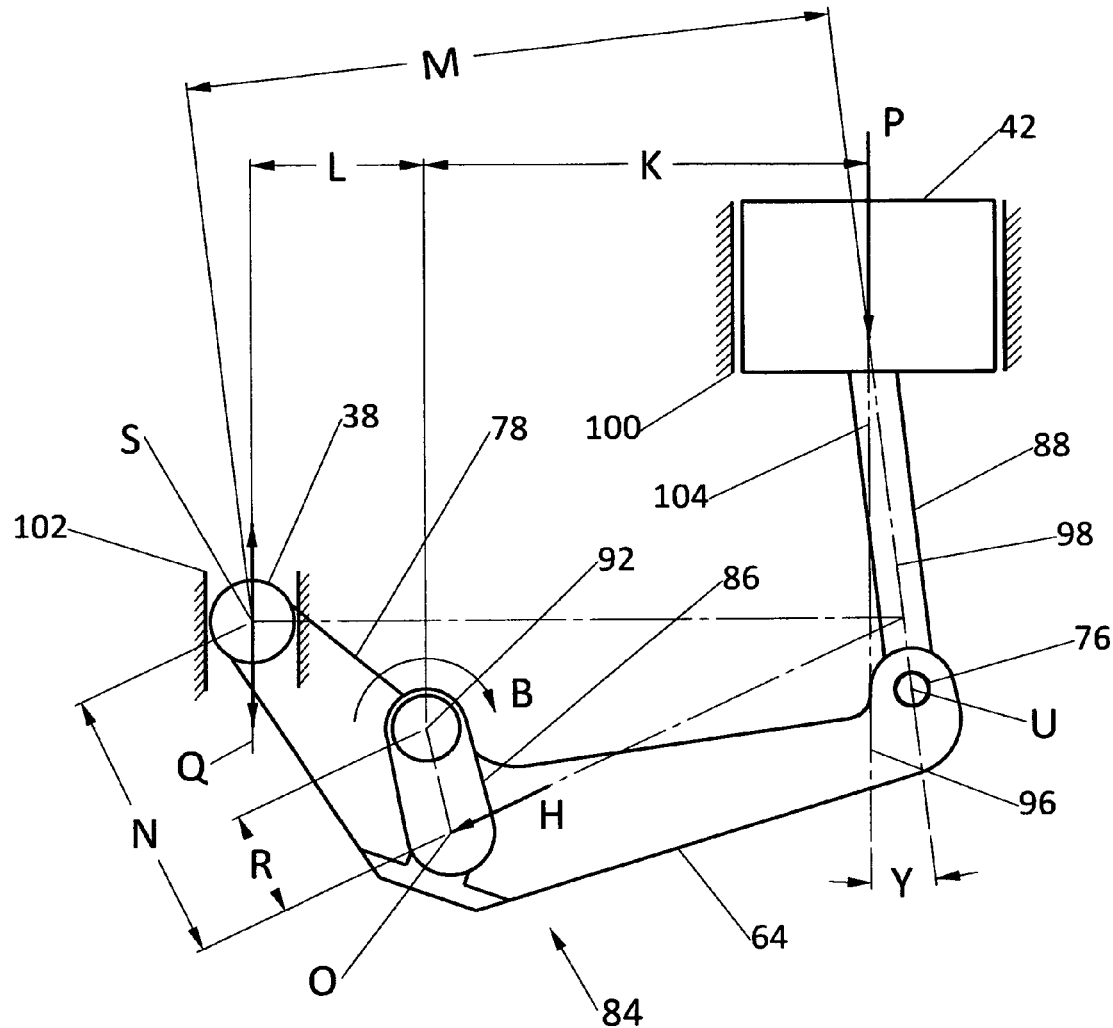
FIG. 5 is a schematic diagram of force of a rotational moment amplification of an exemplary embodiment of an apparatus for an inline engine of the present invention.

FIG. 5 is a schematic diagram of forces for a rotational moment amplification of an exemplary embodiment of an apparatus for an inline engine of the present invention. Axis 92 of the crankshaft 86 is the center of its rotation. Force P, moving the piston 42 down the cylinder 100 (shown schematically) and acting along a cylinder center line or axis 104 is transmitted to the rocker arm/lever assembly 60 in the direction from the wrist pin 94 disposed inside of the piston 42 to the opening 76 of the extended arm 64 of the rocker arm/lever assembly 60 along the centerline 98 of the connecting rod 88. The cylinder center line 104 is at the same time a center line of the piston 42. The rollers 38, of the arm 78 of the rocker arm/lever assembly 60, can move only back and forth along substantially defined line "Q" in a confined pathway/guide 102 (shown schematically). The direction of that line, as well as configuration of the confined pathway/guide is also defined by overall design requirements of an engine. That controlled movement of the distal end 80 of the extended arm 78 of the rocker arm/lever assembly 60 guarantees that the rocker arm/lever assembly 60 does not spin during rotation of the crankshaft 86. The distal end 80 of the extended arm 78 of the rocker arm/lever assembly 60, serves as the fulcrum, which is designated by letter "S", of the rocker arm/lever assembly 60 as well. In the present embodiment of the current invention, line "Q" is a vertical straight line. In this case, force "H", which causes rotation of the crankshaft 86, as indicated by arrow B, is acting along the line between the center of the opening 76 at the distal end 74 of the extended arm 72 of the rocker arm/lever assembly 60 designated by letter "U" and an axis of the crankpin 90 of the crankshaft 86 designated by letter "O". Distance "R", between force H and the axis of rotation 92, is the arm of the rotational moment. Distance between force H and the fulcrum S is designated by letter "N". Distance between force acting along the centerline 98 of the connecting rod 88 and the fulcrum S is designated by letter "M". Value of force H is determined by the rule of a lever. Rotational moment or torque applied to the crankshaft 86 is a product of force H and its arm R with respect to the axis of rotation 92. Letter "K" designates offset of the piston 42 with respect to the crankshaft 86. Distance between the fulcrum S of the rocker arm/lever assembly 60 and the axes 92 of the crankshaft 86 rotation is designated by letter "L".

In a typical arrangement of a conventional internal combustion engine, the end of the connecting rod which is journaled on the throw of the crankshaft travels in a circular path. In that arrangement, the distance that the piston moves up and down in its cylinder, otherwise called "piston displacement", and the distance that the end of the connecting rod oscillates in the transverse direction are the same and equal to the diameter of that abovementioned circular path. This particular distance defines an acute angular span between the cylinder axis and the centerline between the end of the connecting rod connected to a wrist pin disposed inside of the piston and the end of the rod journaled on the throw of the crankshaft. This angle directly affects friction loses when the piston travels inside the cylinder. Any increase of the throw of the crankshaft automatically increases the angle and, as a consequence, associated friction loses.

Figure 6:
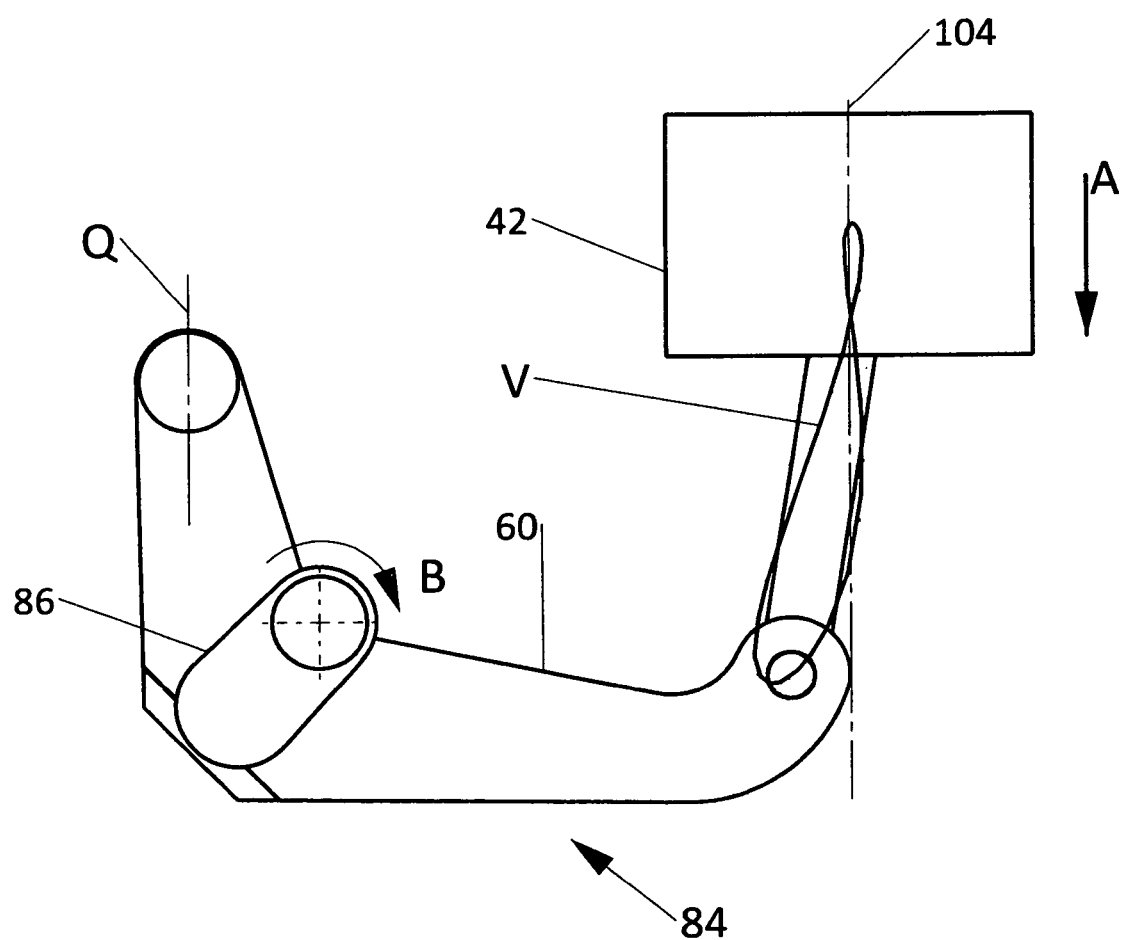
FIG. 6 is a view illustrating a path of a distal end of a rocker arm/lever assembly per revolution of a crankshaft of the apparatus of the present invention.

On the other hand, the distal end 74 of the rocker arm/lever assembly 60 of the exemplary embodiment of the device of the present invention travels during a full rotational cycle on a path designated in FIG. 6 by letter "V". Piston travel or displacement is defined by the very top and the very bottom points of the curve V, whereas, as obvious from FIG. 6, the end of the connecting rod 88 connected to the opening 76 of the extended arm 72 of the rocker arm/lever assembly 60 oscillates with respect to the cylinder center line 104 significantly less than that distance. It is easily understood that, as a result, in the embodiment of the device of the present invention friction loses inside the cylinder will be smaller. An angle between the cylinder center line 104 and the center line 98 of the connecting rod axis 88 is designated by letter "Y" in FIG. 5, which is a design parameter. Changing the offset K allows to split the oscillation in such a way that the angle Y is relatively small during most of the power downstroke when pressure inside the cylinder is high and value of the angle Y increases only at the end of the power downstroke and the beginning of the compression upstroke, i.e. when pressure inside the cylinder is less. It adds additional control of friction loses in a power stroke even with added rolling friction in rollers 38. At the same time by varying values of the angle G between the arms 72 and 78 in the rocker arm/lever assembly 60 and value of distance L, it is possible to increase duration of the downstroke (power stroke and intake stroke) to over 180° in the exemplary embodiment of the device of the present invention. Therefore, the internal combustion engine has a longer time power stroke/intake cycle than exhaust cycle and that improves aspiration of the engine and increases power output. When used in compressors, the intake stroke is extended which improves aspiration for a compressor. At the same time, the overall value of the piston displacement of the mechanism of the present invention depends to a greater degree on the lengths of the lever arms with respect to the fulcrum than the size of the crank of the crankshaft. It adds additional control to the overall power of the engine. It should be obvious that, because the distal end 74 of the rocker arm/lever assembly 60 of the exemplary embodiment of the device of the present invention travels during a full rotational cycle on the path V, which is different from a circle in a conventional ICE, rate of volume change in the cylinder of the present invention will be different as well benefiting power output of the engine.

Figure 7:
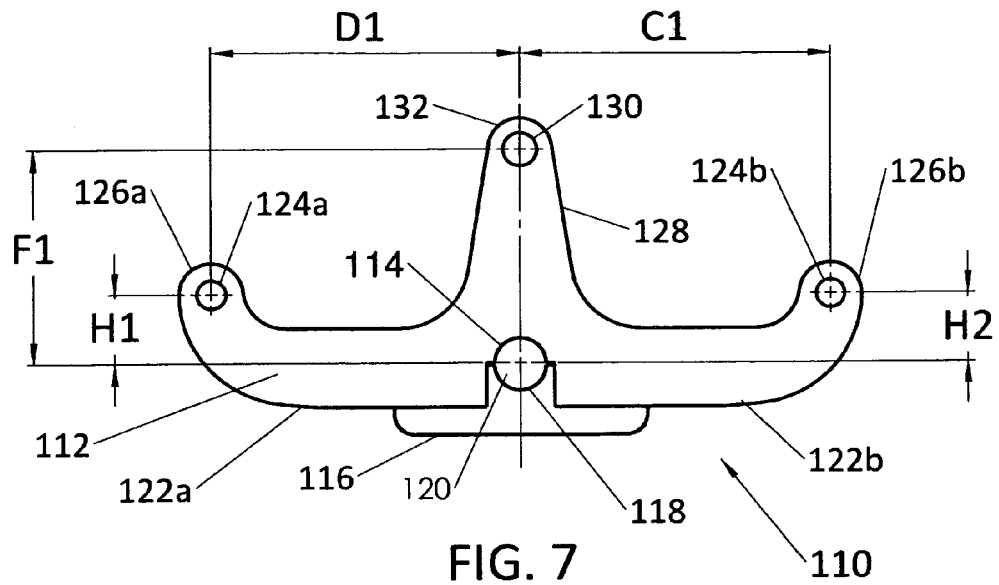
FIG. 7 is a front view of an exemplary embodiment of a rocker arm/lever assembly for a U-engine of the present invention.

An example of a rocker arm/lever assembly 110 of the present invention for a U-engine is shown in FIG. 7. The rocker arm/lever assembly 110 consists of a main body 112 with a semicircular opening 114 and an attached retaining portion 116 with a semicircular opening 118. The retaining portion 116 is fastened to the main body 112 of the rocker arm/lever assembly 110 thus defining an opening 120 which is a cylindrical concavity for realization of a pivotal connection to a crankpin of a crankshaft. The rocker arm/lever assembly 110 has two extended arms 122a and 122b with opening 124a and 124b at corresponding distal ends 126a and 126b of it for pivotally connecting to one end of corresponding connecting rods 88a and 88b of FIG. 8 with pins (not shown) and another extended arm 128 with an opening 130 at the distal end 132 of it for pivotally mounting a pair of rollers 38 of FIG. 8. The arms 122a and 122b extend in opposite directions from the cylindrical concavity 120 and their lengths are indicated by C1 and D1 as distances between the cylindrical concavity 120 and the openings 124a and 124b of the extended arms 122a and 122b. Distances C1 and D1 are defined by design requirements and can differ. Length of the arm 128 is indicated by F1 as a distance between the opening 120 in the rocker arm/lever assembly 110 and the opening 130 of the extended arm 128. This parameter is defined by design requirements as well. The openings 124a and 124b are offset up from the opening 120 by distance H1 and H2 respectively. These distances are defined by the design requirements and can be different.

Figure 8:
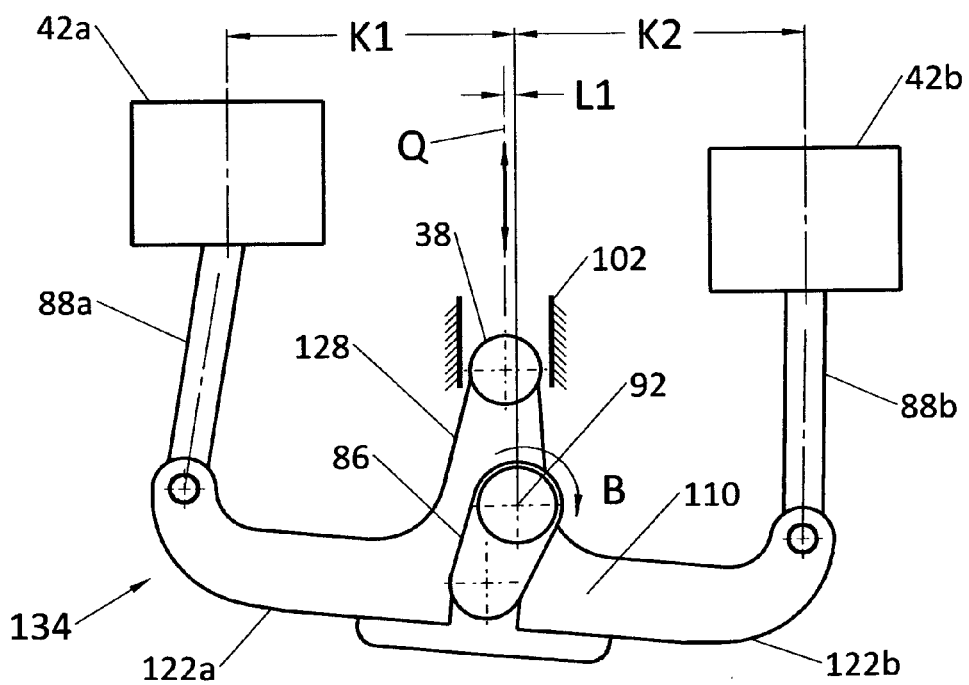
FIG. 8 is a front view of an exemplary embodiment of an apparatus for a U-engine of the present invention.

An exemplary embodiment of the reciprocating piston mechanism with extended piston offset of the present invention for the U-engine utilizing rocker arm/lever assembly 110 is shown generally in FIG. 8 and as a whole is designated by reference numeral 134. This particular embodiment of the current invention comprises the crankshaft 86, a pair of connecting rods 88a and 88b, a pair of pistons 42a and 42b and the pair of rollers 38. Extended arms 122a and 122b of the rocker arm/lever assembly 110 are pivotally connected at their distal ends to one of the ends of the corresponding connecting rods 88a and 88b. The other ends of the corresponding rods 88a and 88b are pivotally connected to the wrist pins of the corresponding pistons 42a and 42b disposed inside of the pistons. The extended arm 128 of the rocker arm/lever assembly 110 at its distal end 132 has the pair of rollers 38 on a pin (not shown) pivotally mounted in the opening 130. The rollers 38 of the arm 128 of the rocker arm/lever 110 can move up and down only along substantially defined vertical line Q in a confined pathway/guide 102 (shown schematically). Distance L1 of the line S from the axis 92 of rotation of the crankshaft 86 is defined by design parameters. Distances K1 and K2 indicating positions of the pistons 42a and 42b center lines inside their respective cylinders (not shown) are defined by design parameters and can be different. This assembly serves to convert the reciprocating up and down motion of the pistons 42a and 42b to the rotational motion of the crankshaft 86 as indicated by arrow B.

Neither inlet and outlet valves nor corresponding camshafts and spark plugs are shown in FIGS. 4 and 8 because they are not affected in any way by the current invention.

A method of the invention for increasing the torque on the output shaft and/or for reducing the fuel consumption of the internal combustion engine comprises replacing a crankshaft, a connecting rod and a piston of a conventional internal combustion engine with the device of the present invention that contains at least one cylinder having a longitudinal axis, at least one piston that has a pivot pin and is slidingly installed in the cylinder, a crankshaft, which is offset at a distance from the longitudinal axis of the cylinder, a rocker arm/lever assembly pivotally mounted on an offset rod journal, or a crankpin of the crankshaft, and a connecting rod connecting the piston and one end of the rocker arm/lever. The other end of the rocker arm/lever assembly can move back and forth only along a substantially defined line in a confined pathway/guide.

During the operation, the power piston 42 as in FIG. 4 moves linearly in the directions of arrow A and converts by means of the connecting rod 88 and the rocker arm/lever assembly 84, pivotally mounted on the crankpin 90 of the crankshaft 86 reciprocating motion into rotational motion of the abovementioned crankshaft 86 (as indicated by directional arrow B in FIG. 4) which results in rotation of the crankshaft 86. As the crankshaft 86 rotates in the direction of arrow B, it translates by means of the rocker arm/lever assemblies pivotally mounted on the crankpins of the crankshaft 86 and the connecting rods into linear reciprocating movements of the pistons in the cylinders of the engine.

Thus, it has been shown that the apparatus of the invention performs its functions substantially in the same way as a conventional crankshaft type but with a greater possibility of adjusting design parameters of the mechanism. In other words, the apparatus of the invention provides an alternative to a conventional crankshaft/piston mechanism for an internal combustion engine that is still simple in design and inexpensive. By adding a rocker arm/lever assembly, this apparatus provides additional tools such as arms of a rocker arm/lever assembly and a piston offset to build a better engine. By amplifying a force, produced during fuel combustion, this apparatus will deliver torque for the required power of an internal combustion engine using less fuel. On the other hand, at the same fuel consumption this apparatus will increase torque and power of the engine if and when needed. This particular apparatus of the current invention will allow building an internal combustion engine with two parallel banks of cylinders, i.e., a U-engine which is simpler in design, less expensive and easier to manufacture than a V-engine.

While preferred embodiments have been shown and described, various modifications and substitutions may be made thereto without departing from the spirit and scope of the invention. In fact, even though only one position of a fulcrum is indicated on the drawings, the fulcrum can be positioned anywhere outside of an opening of a cylindrical concavity and directions of its restricted movement can vary as well. Furthermore, a first order lever can replace the second order lever to offset the piston. It is also assumed that all pivotally mounted components have appropriate bearings as well, although they are neither shown nor described. Even though this embodiment describes the apparatus as applied for an internal combustion engine, one skilled in the art would recognize that compressors and pumps are within the scope of this invention also. Accordingly, it is to be understood that the present invention has been described by way of illustration and not limitation.

What I claim is:

1. A reciprocating piston mechanism with extended piston offset, comprising: a main crankshaft having a central axis, a crank, and a crankpin on the crank; a lever assembly having means for pivotally mounting the lever assembly on the crankpin of the crankshaft, the lever assembly includes at least a first arm and a second arm; at least one cylinder, that has a longitudinal axis offset at a distance from said main crankshaft central axis; a piston slidingly installed in said at least one cylinder, the piston having a pivot pin; a connecting rod having one end pivotally connected to said second arm of the lever assembly and another end, pivotally connected to said piston; at least one roller rotationally installed on said first arm of the lever assembly, and a guide for guiding the roller along a predetermined stationary pathway, said stationary pathway extending parallel to said cylinder longitudinal axis, where said roller functions as a fulcrum of the lever assembly, wherein said guide and said cylinder are located above a horizontal plane passing through said main crankshaft central axis.

2. The reciprocating piston mechanism according to claim 1, wherein said lever assembly includes a third arm that extends substantially outward from the means for pivotally mounting the lever assembly on said crankpin of the crankshaft in the direction opposite to the second arm; a second cylinder that has a longitudinal axis offset at a distance from said main crankshaft central axis; a second piston slidingly installed in said second cylinder, the second piston having a pivot pin; and a second connecting rod having one end pivotally connected to said third arm of said lever assembly and another end pivotally connected to said second piston.

\* \* \* \* \*